United States Patent [19]
Sato et al.

[11] Patent Number: 5,860,776
[45] Date of Patent: Jan. 19, 1999

[54] MAIN SPINDLE DEVICE FOR MACHINE TOOLS

[75] Inventors: Kyuichi Sato; Shuji Fujita, both of Niigata, Japan

[73] Assignee: Niigata Engineering Co., Ltd., Tokyo, Japan

[21] Appl. No.: 791,219

[22] Filed: Jan. 31, 1997

[30] Foreign Application Priority Data

Feb. 1, 1996 [JP] Japan ................................. 8-016892

[51] Int. Cl.$^6$ ................................................. B23C 5/26
[52] U.S. Cl. ............................. 409/233; 408/56; 409/136
[58] Field of Search ............................... 279/2.02, 2.12; 408/56, 57; 409/136, 231, 233

[56] References Cited

U.S. PATENT DOCUMENTS

| | | | |
|---|---|---|---|
| 4,068,559 | 1/1978 | Schmid, Jr. et al. | 409/233 |
| 4,997,325 | 3/1991 | Heel et al. | |
| 5,443,340 | 8/1995 | Reinauer et al. | 409/233 |

FOREIGN PATENT DOCUMENTS

| | | |
|---|---|---|
| 0 339 321 A1 | 11/1989 | European Pat. Off. . |
| 0 391 262 A1 | 10/1990 | European Pat. Off. . |
| 25 45 713 | 11/1976 | Germany . |

*Primary Examiner*—Daniel W. Howell
*Attorney, Agent, or Firm*—Scully, Scott, Murphy & Presser

[57] ABSTRACT

A main spindle apparatus for machine tools wherein a tool holder (T) having an anchoring edge on an inner circumferential surface and inserted into an attachment hole of a main spindle (1) is anchored to the main spindle (1) by expanding a collet (12) having an anchoring portion on the outer circumferential surface so that the anchoring portion engages with the anchoring edge. Pressure receiving surfaces (12b, 12c) which gradually decrease in diameter in approaching the tip are formed on the inner circumferential surface of the collet (12). The main spindle (1) is provided with a push rod (2) which expands the collet by means of pressure applying surfaces (2d, 2e) formed on the outer circumferential surface and gradually decreasing in diameter in approaching the tip, which press the pressure receiving surfaces (12b, 12c) of the collet (12) when the push rod (2) is moved forward so as to approach the tool holder (T).

13 Claims, 5 Drawing Sheets

MAIN SPINDLE DEVICE FOR MACHINE TOOLS

BACKGROUND OF THE INVENTION

1. Technical Field of the Invention

The present invention relates to main spindle devices for removably attaching tools to the spindles of machine tools.

2. Background Art

Figure 8:
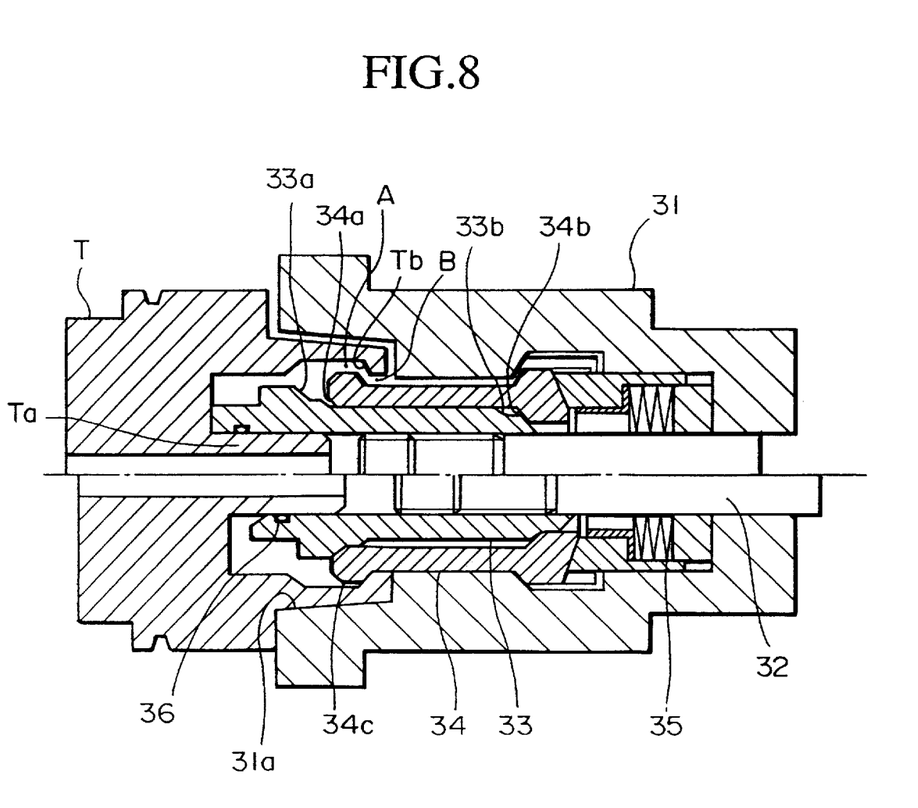
FIG. 8 is a vertical section view showing a conventional main spindle apparatus for machine tools.

As a conventional main spindle device for machine tools, the type shown in FIG. 8 is commonly known. This main spindle device is inserted into a main spindle 31, and is composed of a pipe-shaped draw bar 32 which moves right and left in the view shown in FIG. 8 by means of a motion means, a tube member 33 affixed to the tip of the draw bar 32, and a collet 34 with an expandable diameter fitted onto the outer circumference of the tube member 33. Pressure applying surfaces 33a and 33b which gradually expand in approaching the tip are formed on the outer circumferential surface of the tube member 33, pressure receiving surfaces 34a and 34b which gradually expand in approaching the tip are formed on the inner circumferential surface of the collet 34, and an anchoring portion 34c is formed on the outer circumferential surface of the collet 34.

When attaching a tool to the main spindle device, the tool holder T is first inserted into an attachment hole 31a in the main spindle 31, and a coolant connecting tube portion Ta is fitted onto the tube member 33 (see the top half of FIG. 8). Then, upon moving the draw bar 32 to the right in FIG. 8, the pressure receiving surfaces 34a and 34b are pressed against the pressure applying surfaces 33a and 33b so as to expand the diameter of the collet 34. As a result, the anchoring portion 34c is engaged with the anchoring end Tb of the tool holder T so as to anchor the tool holder T to the main spindle 31 as shown in the bottom half of FIG. 8.

However, the conventional main spindle device described above has a structure wherein the coolant connecting tube portion Ta is fitted onto the tube member 33 when the tool holder T is inserted into the attachment hole 31a of the main spindle 31. For this reason, the tool T must be moved linearly and precisely so as to be aligned with the central axis of the main spindle 31 (tube member 33). Therefore, when using an automatic tool exchange apparatus which inserts tools into the attachment hole 31a of the main spindle 31 along a curved path, the gap between the coolant connecting tube portion Ta and the tube member 33 must be enlarged, thereby making it difficult to seal the coolant.

Additionally, with the above-described conventional main spindle device, the retraction of the draw bar 32 causes the collet 34 to expand and the tool holder T to contact the main spindle 31 simultaneously. Therefore, the maximum amount of retraction of the draw bar 32 is restricted by the amount of retraction of the collet 34 and the final amount of insertion of the coolant connecting tube portion Ta into the tube member 33. Consequently, it becomes difficult to increase the magnifying ability by reducing the angle of inclination between the pressure applying surfaces 33a and 33b, and the pressure receiving surfaces 34a and 34b. Moreover, since the allowance of the clamp between the pressure applying surfaces 33a and 33b and the pressure receiving surfaces 34a and 34b is determined by the widths of the gaps A and B, if the positions of the boldface lines in FIG. 8 are not aligned, the gaps A and B will disappear and clamping will not be possible. Thus, good work precision is a stringent requirement.

Furthermore, a disc spring is used to reinforce the anchoring force of the collet 34 on the tool holder T by increasing the retraction of the draw bar 32, but this makes vibrations more likely to occur during high-speed rotation of the tool because the disc spring 35 is a non-continuous element. Additionally, when the tools are removed from the main spindle 31 by contracting the collet 34, hysteresis causes a large return force to be necessary, and the amount of work increases. Moreover, disc springs 35 have comparatively short lifespans, and their maintenance requires care.

On the other hand, the guiding precision of automatic tool exchanging devices is comparatively low, and the tool insertion path with respect to the main spindle 31 easily becomes misaligned with the central axis of the tube member 33. Consequently, the inner circumferential surface of the tube member 33 and the sealing member 36 attached thereto tend to become worn quickly, not only in the case of the above-described tool exchange devices which trace a curved insertion path, but also in the case of tool exchange devices with linear insertion paths, and these also require care for maintenance.

SUMMARY OF THE INVENTION

The present invention offers a main spindle device for machine tools comprising a collet having an anchoring portion on the outer circumferential surface for anchoring a tool holder to a main spindle by expanding the collet so that the anchoring portion engages with an inner circumferential surface of the tool holder inserted into an attachment hole of the main spindle, wherein pressure receiving surfaces which gradually decrease in diameter in approaching a tip side are formed on an inner circumferential surface of the collet; the main spindle is provided with a push rod which is capable of advancing to the tool holder side; and pressure applying surfaces which gradually decrease in diameter in approaching a tip side are formed on an outer circumferential surface of the push rod, and press the pressure receiving surfaces of the collet to expand the collet.

In this case, it is preferable that a tubular fitting portion is formed on a tip portion of the push rod for fitting a coolant connecting tube portion of the tool holder by means of advancement of the push rod which expands the collet.

Furthermore, it is preferable that the collet is capable of moving in an axial direction of the main spindle, and collet retracting means for retracting the collet when advancing the push rod to expand the collet are provided between the push rod and the collet.

In another aspect of the main spindle device for machine tools of the present invention, the fitting portion is provided with a valve which is biased towards a tip side by means of a push spring to close off the fitting portion, and opens up the fitting portion by being pushed towards a base side along with the fitting to the coolant connecting tube portion.

In this case, the collet retracting means comprises a retraction tapered surface which is advanced along with the push rod; a stopping member attached so as to stop advancement of the main spindle; a movable member held by the stopping member which is capable of moving in a radial outward direction of the push rod when pushed by the retraction tapered surface by advancement of the push rod; a retracting member which is capable of moving in an axial direction of the main spindle when pushed by the collet and retracts with the collet along with the radial outward movement of the movable member by advancement of the push rod; and biasing means for biasing the retracting member in the direction of advancement.

Alternatively, the collet retracting means may comprise a cylindrical retracting member attached to the collet such as to be capable of moving in an axial direction of the main spindle and into which the push rod is inserted in an airtight manner; a stopping member attached to the main spindle so as to stop advancement, into which the push rod is inserted in an airtight manner, and inserted into the retracting member in an airtight manner and so as to be capable of moving relative to the retracting member; and a cylinder chamber formed between the retracting member and the stopping member into which liquid is sealed.

On the other hand, the main spindle is provided with a push rod which advances in the direction of the tool holder to expand the collet, and the push rod may comprise a tubular rod main body and a tube member screwed onto a tip thereof, with adjustment spacers positioned between the rod main body and the tube member, the overall length of the push rod being capable of adjustment by changing the screwing width between the rod main body and the tube member.

PREFERRED EMBODIMENTS OF THE INVENTION

Embodiment 1

Figure 1:
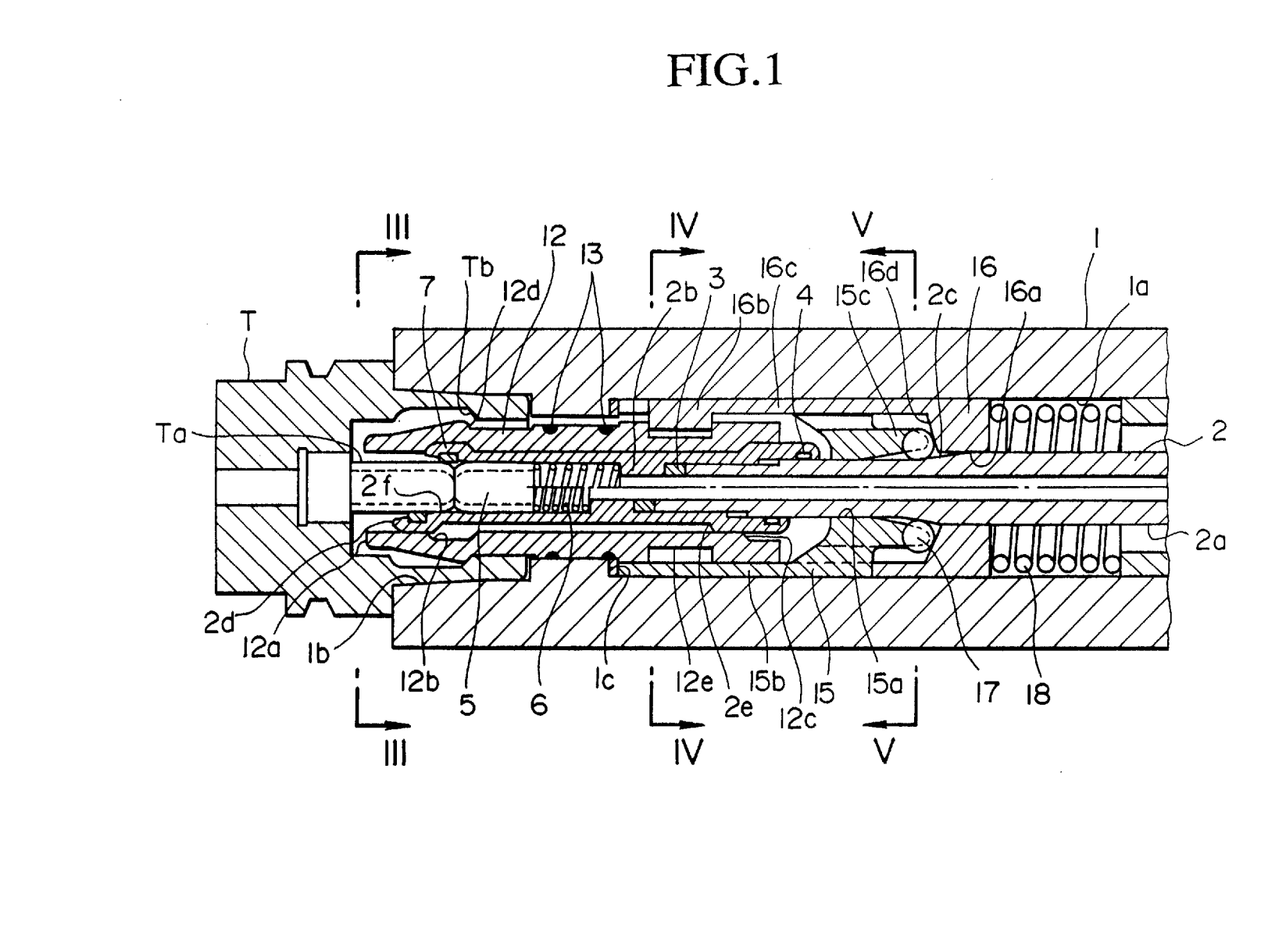
FIG. 1 is a vertical section view of an embodiment of the main spindle device for machine tools according to the present invention.

An embodiment of the present invention is shown in FIG. 1. In FIG. 1, a push rod 2 is coaxially inserted into the central hole of main spindle 1. The push rod 2 comprises a tube member 2b screwed onto the outer circumferential surface of the tip of a pipe-shaped rod main body 2a, and is capable of moving right and left as seen in FIG. 1 by a motion means (not shown). An adjustment spacer 3 is provided between the rod main body 2a and the tube member 2b, and the length of the push rod 2 is capable of being adjusted by changing the screwing length between the rod main body 2a and the tube member 2b. The joint portion between the rod main body 2a and the tube member 2b is sealed by a sealing member 4.

A retraction tapered surface 2c which gradually decreases in diameter in approaching the tip of the rod main body 2a is formed on the outer circumferential surface of the rod main body 2a. Pressure applying surfaces 2d, 2e which gradually decrease in diameter in approaching the tip of the tube member 2b is formed on the outer circumferential surface of the tube member 2b, and the open end portion of the tube member 2b forms a fitting portion 2f which fits with a coolant connecting tube portion Ta of the tool holder T which is inserted into the attachment hole 1b of the main spindle 1.

Figure 2:
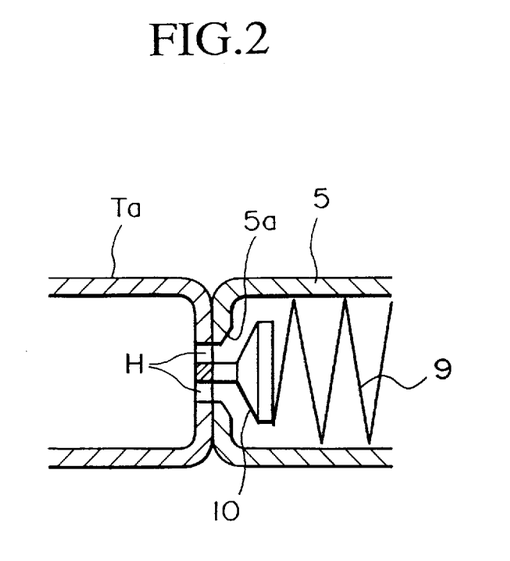
FIG. 2 is a vertical section view showing the relationship between the coolant connecting tube portion and the movable member.

A movable tube 5 and a return spring 6 are provided inside the tube member 2b, and a sealing member 7 is provided on the inner circumferential surface of the tip of the fitting portion 2f. Additionally, as shown in FIG. 2, the movable tube 5 is provided with a valve 10 which closes the movable tube 5 when pressed against a valve seat 5a by means of a pushing spring 9. When the push rod 2 is moved forward to fit the fitting portion 2f with the coolant connecting tube portion Ta, this valve 10 is pushed by the tube portion Ta and separated from the valve seat 5a as shown in FIG. 2 so as to allow coolant to flow freely through holes H which are formed the coolant connecting portion Ta.

In this case, the return spring 6 is pushed against the movable tube 5 and compressed when the fitting portion 2f and the coolant connecting tube portion Ta are fitted together by the forward movement of the push rod 2. Additionally, the fitting portion between the tube member 2b and the coolant connecting tube portion Ta is sealed by means of a sealing member 7 which contacts the outer circumferential surface of the tube portion Ta.

Figure 3:
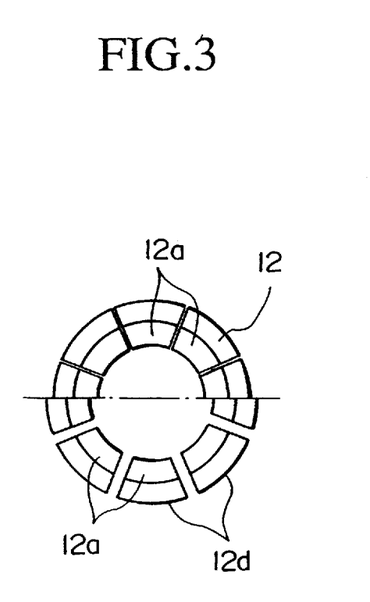
FIG. 3 is a section view of the collet cut along the line III—III of FIG. 1.

A collet 12 is fitted onto the tube member 2b of the push rod 2. The collet 12 comprises eight collet parts 12a which are bundled into a tubular shape by means of two bundle rings 13 composed of coil springs. Pressure receiving surfaces 12b, 12c which gradually decrease in diameter in approaching the tip of the collet 12 are formed on the inner circumferential surface of the collet 12. When the push rod 2 is advanced to the left in FIG. 1, the pressure receiving surfaces 12b, 12c are pressed by the pressure applying surfaces 2d, 2e of the tube member 2b, and the collet 12 expands as shown in the bottom halves of FIGS. 1, 3 and 4. On the other hand, when the push rod 2 is retracted, the collet 12 contracts as shown in the top halves of FIGS. 1, 3 and 4.

On the outer circumferential surface of the collet 12, an anchoring portion 12d and an engaging groove 12e are formed. The anchoring portion 12d engages with an anchoring edge Tb on the inner circumferential surface of the tool holder T which is inserted into the attachment hole 1b of the main spindle 1, as a result of which the tool holder T is anchored to the main spindle 1.

Figure 4:
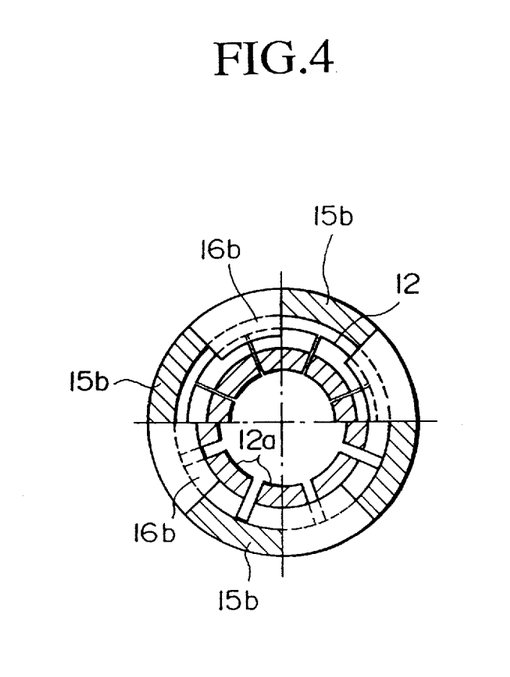
FIG. 4 is a section view cut along the line IV—IV of FIG. 1 showing the relationship between the collet, the stopping leg, and the engaging projection.
Figure 5:
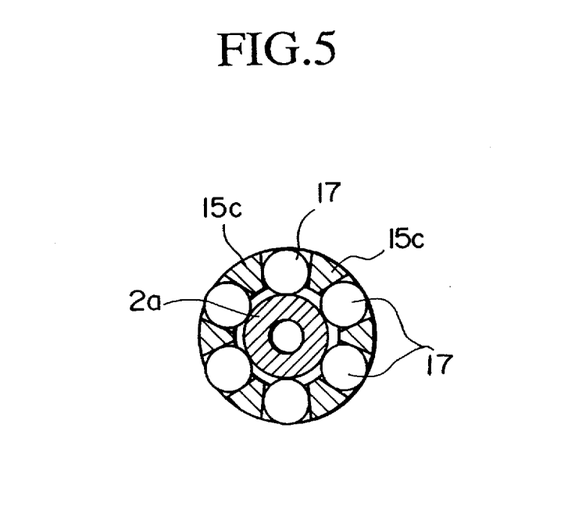
FIG. 5 is a section view cut along the line V—V of FIG. 1 showing the moving member in a state of being held by the holding portion.

A stopping member 15 and a retracting member 16 are inserted into the central hole 1a of the main spindle 1 with the rod main body 2a of the push rod 2 passing through the through holes 15a, 16a. Four stopping legs 15b are provided on one end of the stopping member 15 on the attachment hole side, and six support portions 15c are provided on the other end, spaced at standard intervals as shown in FIGS. 4 and 5 respectively. Each stopping leg 15b contacts a step portion 1c of the main spindle 1, as a result of which the stopping member 15 is stopped from making further progress to the left in FIG. 1.

A movable member 17 composed of a steel sphere is supported on each support portion 15c. The movable members 17 are capable of moving in the radial direction of the push rod 2. Consequently, they move radially outward from the push rod 2 by being pressed by the retraction tapered surface 2c when the push rod 2 moves forward.

The retracting member 16 is composed of four trunk parts 16c disposed between the stopping legs 15b, 15b of the stopping member 15, and engaging projections 16b which engage with the engaging groove 12e of the collet 12 are formed on the inner circumferential surfaces of the trunk parts 16c. On the retracting member 16, the surface which opposes the movable member 17 is formed into a retraction incline surface 16d which gradually decreases in diameter in approaching the collet 12, and the retracting member 16 contacts the movable member 17 at this retraction incline surface 16d. Furthermore, the retracting member 16 is biased in the direction of advancement by means of a coil-shaped bias spring (bias means) 18.

That is, when the push rod 2 is advanced, the movable members 17 pressed against the retraction tapered surface 2c are moved radially outward and pressed against the retraction incline surface 16d, as a result of which the collet 12 retracts along with the retracting member 16.

Next, the function of the main spindle device for machine tools according to the above structure will be explained.

The top half of FIG. 1 shows the tool holder T in an released state. In this state, when the push rod 2 is advanced to the left, the pressure receiving surfaces 12b, 12c of the collet 12 are pushed by the pressure applying surfaces 2d, 2e, so that the collet 12 expands and the anchoring portion 12d engages with the anchoring end Tb of the tool holder T, while the tube member 2b is fitted with the coolant connecting tube portion Ta of the tool holder T.

At the other end, the movable members 17 are pushed radially outward by the retraction tapered surface 2c of the push rod 2, so as to push the retraction incline surface 16d of the retracting member 16 to the right. The retraction member 16 pushed by the movable members 17 retreat to the right along with the collet 12 and pull the tool holder T to the main spindle 1 side, thereby firmly anchoring the tool holder T to the main spindle 1 as shown in the bottom half of FIG. 1.

When the tube member 2b of the push rod 2 is fitted with the coolant connecting tube portion Ta of the tool holder T, the valve 10 is pushed by the tube portion Ta to separate from the valve seat 5a, and it becomes possible to supply coolant to the tool.

On the other hand, when the push rod 2 is retracted, the elasticity of the bundle ring 13 causes the collet 12 to contract, the anchoring portion 12d is separated from the anchoring edge Tb of the tool holder T, and the retracting member 16 is advanced due to the force of the bias spring 18 so that the collet 12 is made to project to the tool holder side. As a result, the tool holder T is completely released from anchorage. When the movable tube 5 separates from the coolant connecting tube portion Ta, the action of the push spring 9 causes the valve 10 to contact the valve seat, and the movable tube 5 is shut off.

Embodiment 2

Figure 6:
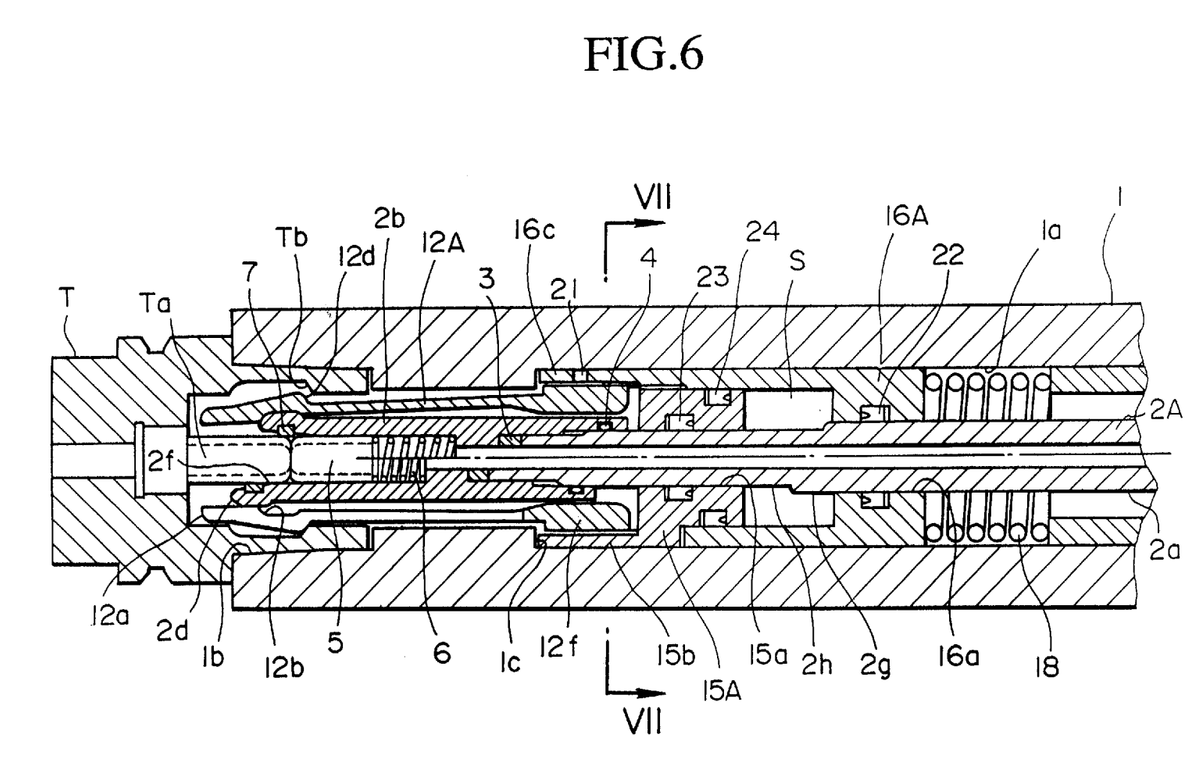
FIG. 6 is a vertical section view showing a second embodiment of the main spindle device for machine tools according to the present invention.
Figure 7:
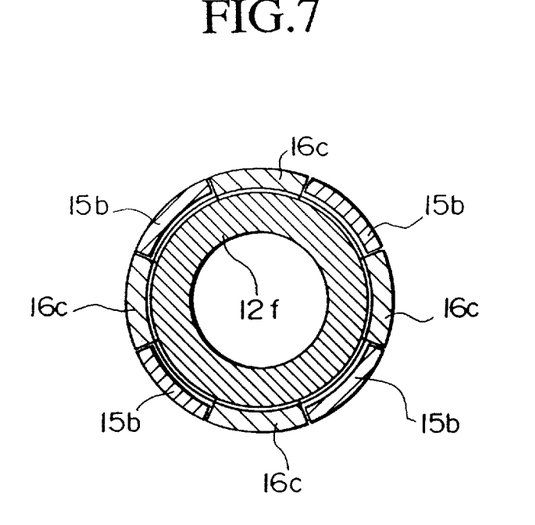
FIG. 7 is a section view cut along the line VII—VII of FIG. 6 showing the relationship between the ring portion and the trunk leaves.

A second embodiment of the present invention is shown in FIG. 6. In the embodiment of FIG. 6, each collet part 12a of a steel collet 12A is provided unitarily with a ring member 12f, and is capable of expanding (or contracting) due to its own elasticity. Additionally, as shown in FIG. 7, the collet 12A is screwed onto the four trunk parts 16c of the retracting member 16A at the ring member 12f, and the ring member 12f is affixed to a retracting member 16A by means of a screw 21. Consequently, the position of the retracting member 16A with respect to the collet 12A can be adjusted by changing the screwing length between the trunk parts 12f and the ring member 12f.

The retracting member 16A is cylindrical, with a large diameter portion 2g of the rod main body 2a of the push rod 2A inserted through a through hole 16a thereof, and a small diameter portion 2h of the rod main body 2a of the push rod 2A is passed through a through hole 15a of the stopping member 15A. The joint portions between these through holes 15a, 16a and the rod main body 2a are sealed by sealing members 22, 23. Furthermore, the stopping member 15A is movably inserted into the retracting member 16A, and the joint portion between the stopping member 15A and the retracting member 16A is sealed by a sealing member 24. As a result, a cylinder chamber S for enclosing a liquid such as oil or the like is formed between the stopping member 15A and the retracting member 16A.

On the other hand, the other structures of the main spindle device of this embodiment are identical to those shown in FIG. 1, so they are given the same reference numerals and their detailed explanation will be omitted.

With the main spindle device of FIG. 6, when the push rod 2A is advanced with the tool holder T in an anchored state as shown in the top half of FIG. 6, the pressure applying surface 2d presses on the pressure receiving surface 12b so as to expand the collet 12A, as with the main spindle device of FIG. 1. The forward movement of the push rod 2A also causes the large diameter portion 2g to enter the cylinder chamber S so as to reduce the capacity of the cylinder chamber S. Then, the retracting member 16A retreats such as to keep the capacity of the cylinder chamber S constant, and the collet 16A moves to the right in FIG. 6. As a result, the tool holder T is pulled to the main spindle side as shown in the bottom half of FIG. 6, and the tool holder T is firmly anchored to the main spindle 1.

On the other hand, when the push rod 2A is retracted with the tool holder T in an anchored state, the collet 12A contracts and the anchoring portion 12d separates from the anchoring edge Tb. Additionally, the retracting member 16A is pushed into motion by the bias spring 18, and forces the collet 12A forward.

In the main spindle device of FIG. 1, the retraction tapered surface 2c, the movable member 17, the retracting member 16 and the bias spring 18 form a collet retraction means. On the other hand, in the main spindle device of FIG. 6, the collet retraction means is composed of the retracting member 16A, the stopping member 15A, the cylinder chamber S and the bias spring 18.

The number of collet parts 12a in the collet 12, 12A, the number of stopping legs 15b on the stopping member 15, 15A, the number of trunk parts 16c on the retracting member 16, 16A, and the shapes of the respective components are not restricted to those shown in the drawings, and various design modifications are possible.

In the main spindle device for machine tools according to the present invention, the magnifying functions of the pressure applying surfaces 2d, 2e and the pressure receiving surfaces 12b, 12c can be sufficiently increased because the amount of anchored (forward) movement of the push rod 2 is not restricted by other elements. For example, while the magnifying ability of the conventional device of FIG. 8 is approximately 3 times, the present invention can increase this to 7 times.

Additionally, by increasing the magnifying ability, the spring energy can be reduced and there is no need to use non-continuous disc springs. Consequently, it is possible to use coil springs which can dampen vibrations and are durable, thus offering an advantage in terms of maintenance. Furthermore, the spring energy for advancement is small, so that the energy (hydraulic pressure) required for retraction can also be small, making the present invention economical.

Moreover, the enlargement function and attachment function are performed by separate operations, so that the collet 12 and the tool holder T can be clamped even if the positions of the collet 12 and the tool holder T are slightly misaligned, thereby increasing the clamp allowance. As a result, manufacturing is made easier than with conventional devices and clamping is possible even if the pressure applying surfaces and pressure receiving surfaces are worn, thus offering advantages in terms of economy and maintenance.

Additionally, when a tubular fitting portion 2f for fitting with a coolant connecting tube portion Ta of a tool holder T with forward movement of a push rod 2 for enlarging a collet 12 is formed on the tip portion of the push rod 2, the tubular portion 2b is retracted and does not get in the way when the main spindle 1 of the tool holder T is inserted into the attachment hole 1b. Furthermore, the insertion path of the tool holder T does not necessarily have to be precisely aligned with the central axis of the tubular member 2b, so that tools can always be inserted into the attachment hole 1b of the main spindle 1 in the case of automatic tool exchange devices wherein the guide precision is low and the insertion path of the tool holder T is non-uniform, or in the case of high-speed automatic tool exchange devices which follow a spiral path during insertion.

Additionally, when forming the collet retraction means by a retraction tapered surface 2c, a movable member 17, a retracting member 16 and a bias spring 18, the timing for the expansion and the retraction of the collet 12 can be optimally adjusted by changing the positional setting of the retraction tapered surface 2c.

On the other hand, when forming the collet retraction means by a retracting member 16A, a stopping member 15A, a cylinder chamber S and a bias spring 18, the biasing force of the bias spring 18 can be adjusted by changing the amount of liquid enclosed in the cylinder chamber S.

We claim:

1. A main spindle device for machine tools comprising a collet having an anchoring portion on the outer circumferential surface for anchoring a tool holder to a main spindle by expanding said collet so that the anchoring portion engages with an inner circumferential surface of said tool holder inserted into an attachment hole of said main spindle, wherein pressure receiving surfaces which gradually decrease in diameter in approaching a tip side are formed on an inner circumferential surface of said collet;

said main spindle is provided with a push rod which is capable of advancing to the tool holder side; and pressure applying surfaces which gradually decrease in diameter in approaching a tip side are formed on an outer circumferential surface of said push rod, and press the pressure receiving surfaces of the collet to expand said collet.

2. A main spindle device for machine tools in accordance with claim 1, wherein said collet is capable of moving in an axial direction of said main spindle, and collet retracting means for retracting said collet when advancing said push rod to expand said collet are provided between said push rod and said collet.

3. A main spindle device for machine tools in accordance with claim 2, wherein said collet retracting means comprises a retraction tapered surface which is advanced along with said push rod; a stopping member attached so as to stop advancement of said main spindle; a movable member held by said stopping member which is capable of moving in a radial outward direction of said push rod when pushed by said retraction tapered surface by advancement of said push rod; a retracting member which is capable of moving in an axial direction of said main spindle when pushed by said collet and retracts with said collet along with the radial outward movement of said movable member by advancement of said push rod; and biasing means for biasing said retracting member in the direction of advancement.

4. A main spindle device for machine tools in accordance with claim 2, wherein said collet retracting means comprises a cylindrical retracting member attached to said collet such as to be capable of moving in an axial direction of said main spindle and into which said push rod is inserted in an airtight manner; a stopping member attached to said main spindle so as to stop advancement, into which said push rod is inserted in an airtight manner, and inserted into said retracting member in an airtight manner and so as to be capable of moving relative to said retracting member; and a cylinder chamber formed between said retracting member and said stopping member into which liquid is sealed.

5. A main spindle device for machine tools comprising a collet having an anchoring portion on the outer circumferential surface for anchoring a tool holder to a main spindle by expanding said collet so that the anchoring portion engages with an inner circumferential surface of said tool holder inserted into an attachment hole of said main spindle, wherein pressure receiving surfaces which gradually decrease in diameter in approaching a tip side are formed on an inner circumferential surface of said collet;

said main spindle is provided with a push rod which is capable of advancing to the tool holder side;

pressure applying surfaces which gradually decrease in diameter in approaching a tip side are formed on an outer circumferential surface of said push rod, and press the pressure receiving surfaces of the collet to expand said collet; and a tubular fitting portion is formed on a tip portion of said push rod for fitting a coolant connecting tube portion of said tool holder by means of advancement of said push rod which expands said collet.

6. A main spindle device for machine tools in accordance with claim 5, wherein said collet is capable of moving in an axial direction of said main spindle, and collet retracting means for retracting said collet when advancing said push rod to expand said collet are provided between said push rod and said collet.

7. A main spindle device for machine tools in accordance with claim 6, wherein said collet retracting means comprises a retraction tapered surface which is advanced along with said push rod; a stopping member attached so as to stop advancement of said main spindle; a movable member held by said stopping member which is capable of moving in a radial outward direction of said push rod when pushed by said retraction tapered surface by advancement of said push rod; a retracting member which is capable of moving in an axial direction of said main spindle when pushed by said collet and retracts with said collet along with the radial outward movement of said movable member by advancement of said push rod; and biasing means for biasing said retracting member in the direction of advancement.

8. A main spindle device for machine tools in accordance with claim 6, wherein said collet retracting means comprises a cylindrical retracting member attached to said collet such as to be capable of moving in an axial direction of said main spindle and into which said push rod is inserted in an airtight manner; a stopping member attached to said main spindle so as to stop advancement, into which said push rod is inserted in an airtight manner, and inserted into said retracting member in an airtight manner and so as to be capable of moving relative to said retracting member; and a cylinder chamber formed between said retracting member and said stopping member into which liquid is sealed.

9. A main spindle device for machine tools in accordance with claim 5, wherein said fitting portion is provided with a valve which is biased towards a tip side by means of a push spring to close off said fitting portion, and opens up said fitting portion by being pushed towards a base side along with the fitting to said coolant connecting tube portion.

10. A main spindle device for machine tools in accordance with claim 9, wherein said collet is capable of moving in an axial direction of said main spindle, and collet retracting means for retracting said collet when advancing said push rod to expand said collet are provided between said push rod and said collet.

11. A main spindle device for machine tools in accordance with claim 10, wherein said collet retracting means comprises a retraction tapered surface which is advanced along with said push rod; a stopping member attached so as to stop advancement of said main spindle; a movable member held by said stopping member which is capable of moving in a radial outward direction of said push rod when pushed by said retraction tapered surface by advancement of said push rod; a retracting member which is capable of moving in an axial direction of said main spindle when pushed by said collet and retracts with said collet along with the radial outward movement of said movable member by advancement of said push rod; and biasing means for biasing said retracting member in the direction of advancement.

12. A main spindle device for machine tools in accordance with claim 10, wherein said collet retracting means comprises a cylindrical retracting member attached to said collet such as to be capable of moving in an axial direction of said main spindle and into which said push rod is inserted in an airtight manner; a stopping member attached to said main spindle so as to stop advancement, into which said push rod is inserted in an airtight manner, and inserted into said retracting member in an airtight manner and so as to be capable of moving relative to said retracting member; and a cylinder chamber formed between said retracting member and said stopping member into which liquid is sealed.

13. A main spindle device for machine tools comprising a collet having an anchoring portion on the outer circumferential surface for anchoring a tool holder to a main spindle by expanding said collet so that the anchoring portion engages with an inner circumferential surface of said tool holder inserted into an attachment hole of said main spindle, wherein said main spindle is provided with a push rod which advances in the direction of said tool holder to expand said collet; and said push rod comprises a tubular rod main body and a tube member screwed onto a tip thereof, with adjustment spacers positioned between said rod main body and said tube member, the overall length of said push rod being capable of adjustment by changing the screwing width between said rod main body and said tube member.

* * * * *